United States Patent
Pacheco

(10) Patent No.: US 10,611,295 B1
(45) Date of Patent: Apr. 7, 2020

(54) OUTER CABIN SEMI TRUCK LIGHT SYSTEM

(71) Applicant: Abel Diaz Pacheco, Cutler Bay, FL (US)

(72) Inventor: Abel Diaz Pacheco, Cutler Bay, FL (US)

( * ) Notice: Subject to any disclaimer, the term of this patent is extended or adjusted under 35 U.S.C. 154(b) by 0 days.

(21) Appl. No.: 16/524,049

(22) Filed: Jul. 27, 2019

(51) Int. Cl.
 *B60Q 1/22* (2006.01)
 *F21S 41/19* (2018.01)
 *F21W 107/10* (2018.01)

(52) U.S. Cl.
 CPC .............. *B60Q 1/22* (2013.01); *F21S 41/192* (2018.01); *B60Q 2900/30* (2013.01); *F21W 2107/10* (2018.01)

(58) Field of Classification Search
 CPC .................................... B60Q 1/22; B60Q 1/24
 See application file for complete search history.

(56) References Cited

U.S. PATENT DOCUMENTS

| | | | | |
|---|---|---|---|---|
| 4,855,878 A * | 8/1989 | Vu | ........................... | B60Q 1/22 362/506 |
| 5,023,760 A * | 6/1991 | Izuno | ................... | B60Q 1/2692 362/485 |
| 6,260,990 B1 * | 7/2001 | Saunders | ............. | B60Q 1/2692 362/459 |
| 10,029,611 B2 * | 7/2018 | Harris | ...................... | F21S 45/50 |
| 2003/0063475 A1 * | 4/2003 | Simmons | .................. | B60Q 1/24 362/526 |
| 2005/0068784 A1 * | 3/2005 | Lee | .......................... | B60Q 1/22 362/506 |
| 2014/0016337 A1 * | 1/2014 | Younger | .................. | B60Q 1/22 362/485 |
| 2015/0175088 A1 * | 6/2015 | Chang | ..................... | B60R 11/04 348/148 |

FOREIGN PATENT DOCUMENTS

| | | | | |
|---|---|---|---|---|
| EP | 1114748 A2 * | 7/2001 | .......... | B60Q 1/0483 |
| WO | WO-2018189342 A1 * | 10/2018 | .......... | B60Q 1/0023 |

* cited by examiner

*Primary Examiner* — Alexander K Garlen
(74) *Attorney, Agent, or Firm* — Ruben Alcoba, Esq.

(57) ABSTRACT

An outer cabin semi-truck light system that illuminates its trailer when the semi-truck moves backwards. The system is made of a pair of retractable light mounts and each retractable light mount has a truck light mount that is attached to each lateral side of a semi-truck cabin, a light enclosure that is attached to the truck light mount via light enclosure pivot that is connected to a first servomotor, and a light source that is placed on a light source pivot that is connected to a second servomotor, the light source is housed within the light enclosure. And, a controller that connects and controls the rotation of the servomotors of the system. The lights of the system are manipulated to light the rear of a trailer being hauled by the operator of a vehicle when he or she is backing the trailer in low-light conditions.

5 Claims, 2 Drawing Sheets

OUTER CABIN SEMI TRUCK LIGHT SYSTEM

BACKGROUND

The present invention is directed to an outer cabin semi-truck light system that illuminates its semi-truck trailer when the semi-truck moves backwards.

Semi-truck trailer drivers are some of the most skilled drivers on the roadways.

These drivers can do driving miracles while operating their semi-trucks. Yet they still tend to get into small accidents when parking backwards.

When parking their trailers, drivers jack and chase their trailers until they reach their desired destination. Jacking the trailers place the rear of the trailers at angles that prevent the drivers from seeing the rear areas wherein they are backing into. In low-light conditions, the lack of sight is exacerbated because the normal light of the semi-truck, when placed backwards, is blocked by the rear body of the trailer.

The present invention is retractable truck light mount that allows a light source to illuminate the rear of the semi-truck trailer, up to one-hundred and twenty degree from the outer lateral sides of the semi-truck cabin, when the semi-truck is moved backwards.

For the foregoing reason there is a need for an outer cabin semi-truck light system that will allow drivers to move their semi-truck trailers backwards in low-light conditions.

SUMMARY

The present invention describes an outer cabin semi-truck light system that illuminates its trailer when the semi-truck moves backwards.

The system is made of a retractable light mounts and each retractable light mount has a truck light mount that is attached to each lateral side of a semi-truck cabin, a light enclosure that is attached to the truck light mount via light enclosure pivot that is connected to a first servomotor, and a light source that is placed on a light source pivot that is connected to a second servomotor, the light source is housed within the light enclosure. And, a controller that connects and controls the rotation of the servomotors of the system. The lights of the system are manipulated to light the rear of a trailer being hauled by the operator of a vehicle when he or she is backing the trailer in low-light conditions.

An object of the present invention is to provide illumination to the rear of a semi-truck trailer being moved backwards so that an operator of the semi-truck can see the area in which he or she is backing into.

Another object of the present invention is to prevent accidents that normally occur in low-light conditions when a semi-truck trailer moves backwards.

DRAWINGS

These and other features, aspects, and advantages of the present invention will become better understood with regards to the following description, appended claims, and drawings where:

DESCRIPTION

Figure 1:
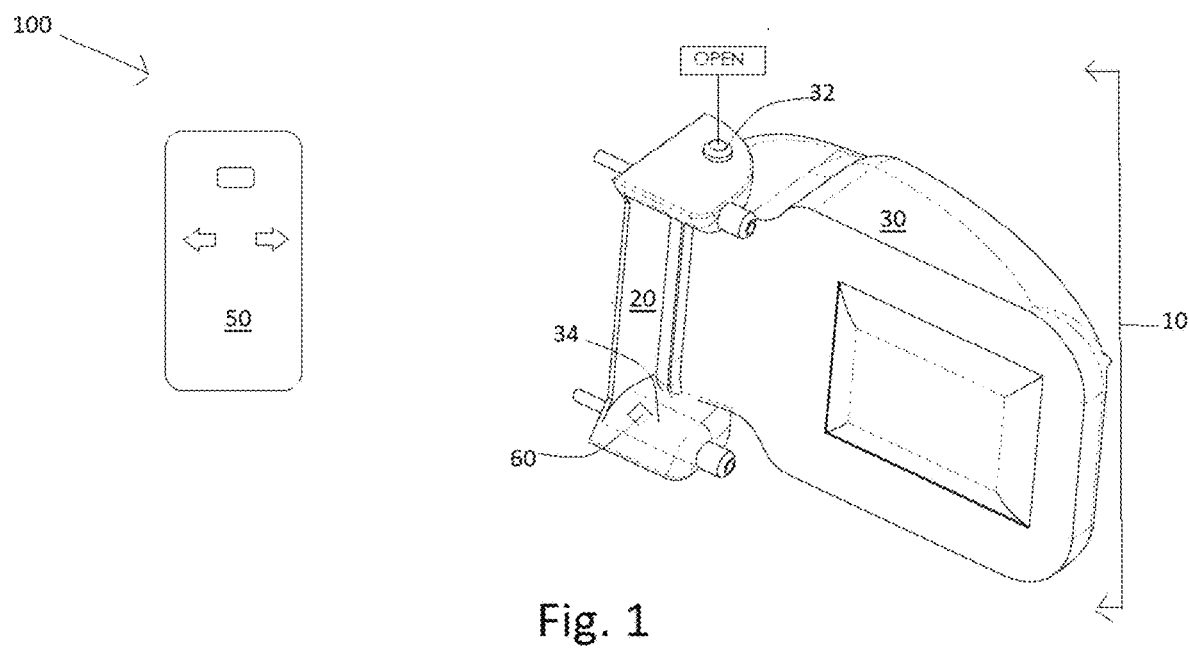
FIG. 1 is a perspective view of one full embodiment of the present invention.
Figure 2:
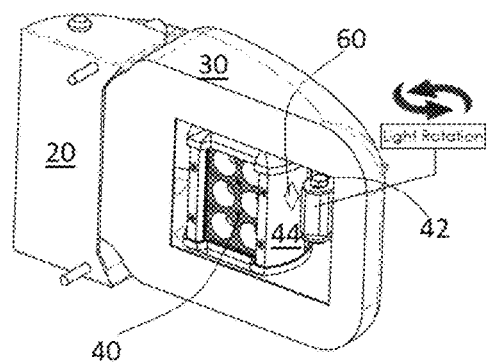
FIG. 2 is a perspective view that shows a light enclosure mounted on a retractable light mount of the present invention.
Figure 3:
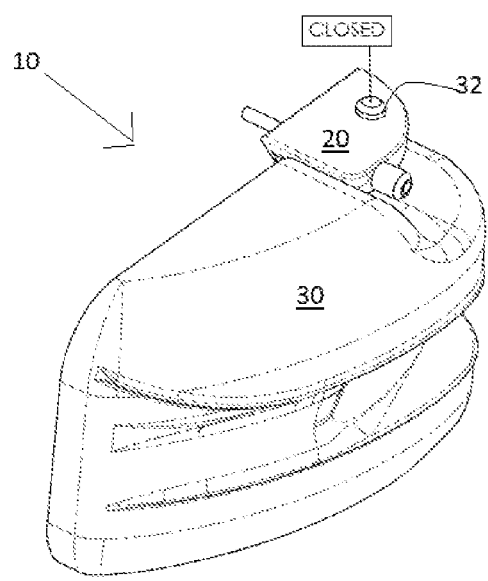
FIG. 3 is a perspective view of the present invention in the closed position.
Figure 4:
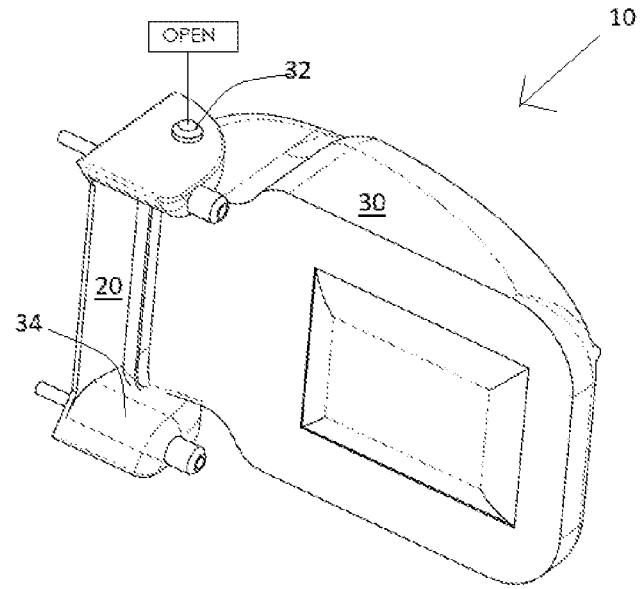
FIG. 4 is a perspective view of the present invention on the open position.
Figure 5:
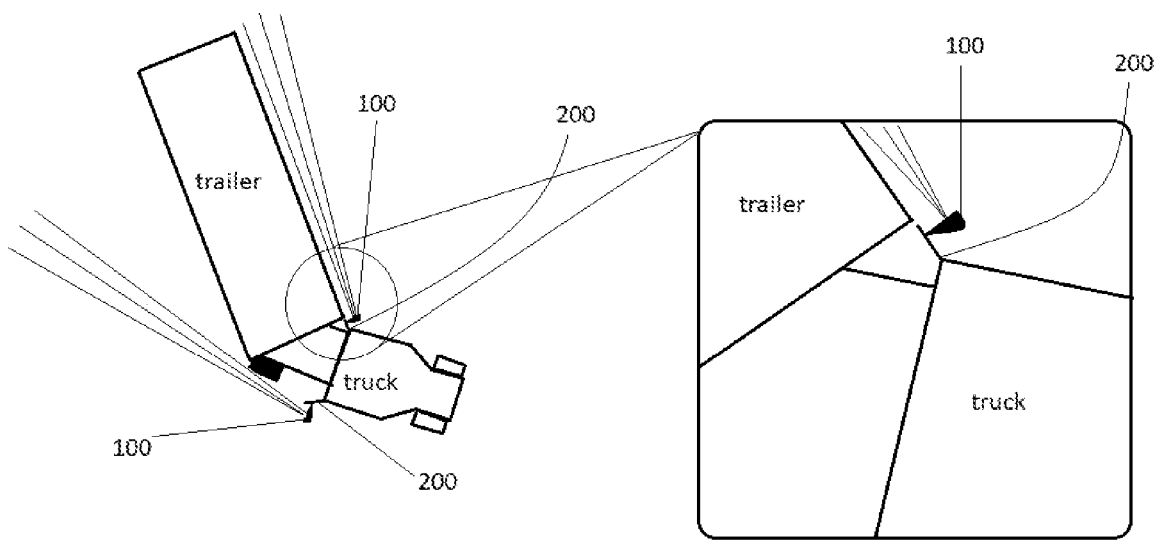
FIG. 5 is a perspective view of the present invention on a semi-truck trailer.

A seen in FIGS. 1-5, the present invention is directed to an outer cabin semi-truck light system 100 that illuminates its trailer when the semi-truck moves backwards. The system 100 comprises of a pair of retractable light mounts 10. Each retractable light mount 10 comprises of a truck light mount 20 that is attached to a lateral side of a semi-truck cabin 200. a light enclosure 30 that is attached to the truck light mount via light enclosure pivot 32 that is connected to a first servomotor 34, and a light source 40 that is placed on a light source pivot 42 that is connected to a second servomotor 44, the light source is housed within the light enclosure 30. And, a controller 50 that connects and controls the rotation of the servomotors 34 and 44.

The first servomotor 34 moves the light enclosure 30 from a zero degree position to a ninety degree position and to a one-hundred and twenty degree position, the zero degree position being a position that is parallel to each lateral side of the semi-truck cabin 200.

The second servomotor 44 moves the light source 40 independently from the movement of the light enclosure 30.

In a preferred embodiment, the controller 50 is a radio frequency controller and the first 34 and second 44 servomotors have a radio frequency receiver 60 that controls the movement of the servomotors 34 and 44.

In preferred embodiments, each truck light mount 20 will be attached to each upper lateral side of the semi-truck cabin.

In preferred embodiments, the light source 30 is powered by a 12 to 24 volt power source 70. The power source 70 can be the semi-truck's battery.

An advantage of the present invention is that it provides illumination to the rear of a semi-truck trailer being moved backwards so that an operator of the semi-truck can see the area in which he or she is backing into.

Another advantage of the present invention is that it prevents accidents that normally occur in low-light conditions when a semi-truck trailer moves backwards.

The embodiments of the apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims.

What is claimed is:

1. An outer cabin semi-truck light system that illuminates its trailer when the semi-truck moves backwards, the system comprises:
    a pair of retractable light mounts, wherein each retractable light mount is attached to a left rear and right rear side of an outer cabin of a semi-truck, each retractable light mount comprises:
    a truck light mount;
    a light enclosure that is attached to the truck light mount via light enclosure pivot that is connected to a first servomotor; and a light source that is placed on a light source pivot that is connected to a second servomotor, the light source is housed within the light enclosure; and a controller that connects and controls the rotation of the servomotors; wherein the first servomotor moves the light enclosure and the light source laterally from a zero degree position to a ninety degree position and the second servomotor moves the light source laterally from the ninety degree position to a one hundred and twenty degree position, the zero degree position being a position that is parallel to each lateral side of the semi-truck cabin.

2. The outer cabin semi-truck light system that illuminates its trailer when the semi-truck moves backwards of claim 1, wherein the second servomotor moves the light source independently from the movement of the light enclosure.

3. The outer cabin semi-truck light system that illuminates its trailer when the semi-truck moves backwards of claim 2, wherein the controller is a radio frequency controller and the first and second servomotors have a radio frequency receiver that controls the movement of the servomotors.

4. The outer cabin semi-truck light system that illuminates its trailer when the semi-truck moves backwards of claim 3, wherein each truck light mount is attached to each upper lateral side of the semi-truck cabin.

5. The outer cabin semi-truck light system that illuminates its trailer when the semi-truck moves backwards of claim 4, wherein the light source is powered by a 12 to 24 volt power source.

\* \* \* \* \*